J. G. TAYLOR.
Churn.
No. 68,805.
Patented Sept. 10, 1867.
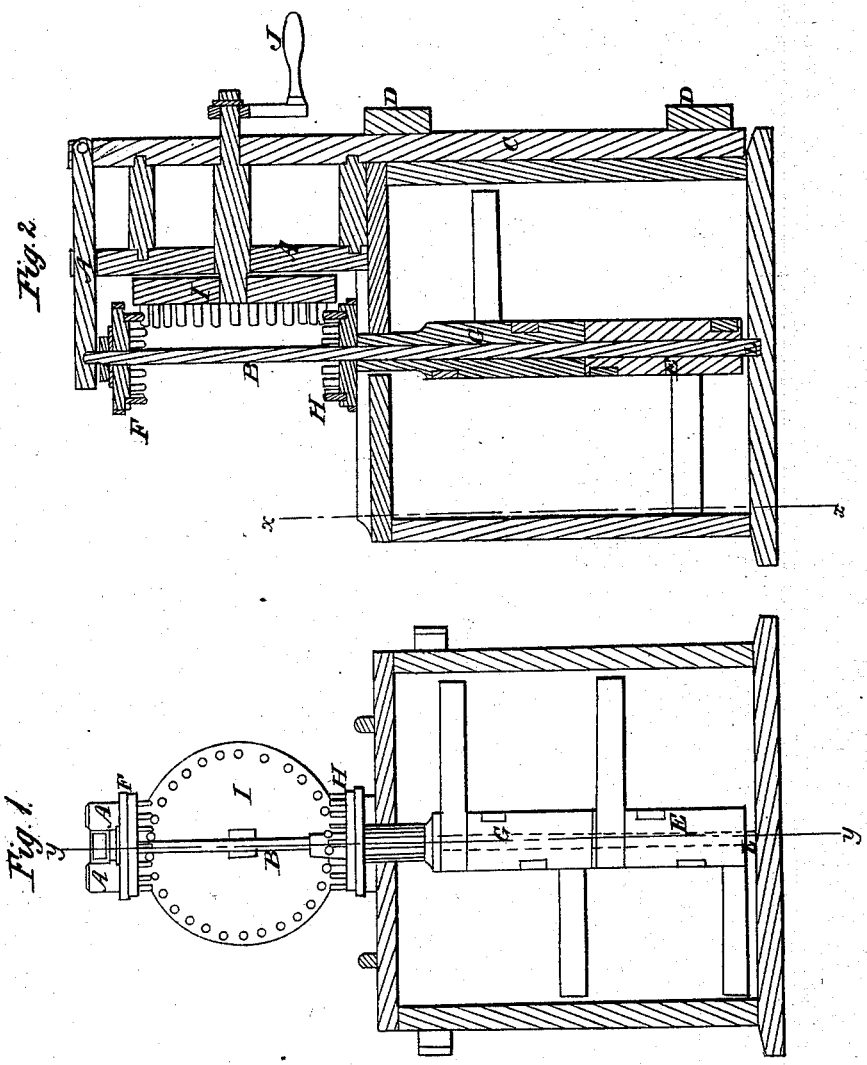

United States Patent Office.

JOHN G. TAYLOR, OF EAST BETHLEHEM, PENNSYLVANIA.

Letters Patent No. 68,805, dated September 10, 1867.

IMPROVEMENT IN CHURNS.

The Schedule referred to in these Letters Patent and making part of the same.

TO ALL WHOM IT MAY CONCERN:

Be it known that I, JOHN G. TAYLOR, of East Bethlehem, in the county of Washington, and State of Pennsylvania, have invented a new and improved Churn; and I do hereby declare the following to be a full and exact description of the same, reference being had to the accompanying drawings, which are made part of this specification, and in which—

Figure 1 is a vertical section on the line $x\ x$, fig. 2.

Figure 2 is a vertical section on the line $y\ y$, fig. 1.

Similar letters of reference indicate corresponding parts in the two figures.

The movable bar A, to which the upper end of the dasher-shaft B is pivoted, and which supports the running gear, is detachable from the body of the churn by slipping the staff C in behind the battens D. The lower section E of the dasher is attached to the central dasher-shaft B, and is revolved by the pinion F; and the upper section G of the dasher runs upon the central shaft and is rotated by the pinion H in a contrary direction to the section E. Both pinions are rotated by the wheel I, put in contrary directions by hand-crank J. The central shaft B has a screw-thread on the lower end to receive a nut, L, which has two arms projecting upward. This nut serves to keep the dashers at the proper height, and its arms hold the lower section E securely to the shaft.

Having described my invention, what I claim as new, and desire to secure by Letters Patent, is—

In a churn, the combination of the adjustable frame K and movable bar A with the detachable dasher E G, having the screw and nut L at the foot of the shaft, the whole being constructed and arranged as herein described.

To the above specification of my improvement I have signed my hand this first day of March, 1867.

JOHN G. TAYLOR.

Witnesses:
 NATHAN K. ELLSWORTH,
 CHAS. A. PETTIT.